United States Patent Office
2,867,528
Patented Jan. 6, 1959

2,867,528

METHOD OF PRODUCING COPPER METAL POWDER

David J. I. Evans, Edmonton, Alberta, and Steve Romanchuk, Fort Saskatchewan, Alberta, Canada, assignors to Sherritt Gordon Mines Limited, Toronto, Ontario, Canada, a company of the Province of Ontario No Drawing. Application November 21, 1957
Serial No. 697,780

6 Claims. (Cl. 75—109)

This invention relates to the production of copper metal powder of desirable physical characteristics and of high purity from aqueous solutions and slurries which contain dissolved salts of copper and at least one of the metals nickel and cobalt.

Methods are known and are in commercial use by means of which certain metals are precipitated as elemental metal particles from solutions in which they are present as dissolved salts by reacting such solutions with a reducing gas, such as hydrogen or carbon monoxide, at elevated temperature and pressure. Powders of metals such as nickel, copper and cobalt, of desirable physical characteristics and of high purity are now being produced on a commercial scale by such methods.

There is a problem in producing copper metal powder of high purity with high recovery from a solution which contains dissolved salts of copper and at least one of the metals nickel and cobalt. Copper values contained in such a solution are reduced and precipitate from the solution relatively rapidly. If the starting solution or slurry contains more than about 1.9 mols of free ammonia per mol of dissolved copper plus nickel and/or cobalt values, nickel and/or cobalt tend to reduce to and precipitate from the solution as metal powder, as the copper content of the solution is depleted, thus contaminating the purity of the desired copper metal powder. This problem can be overcome by conducting the reducing reaction to a dissolved copper content safely above that at which nickel and/or cobalt values tend to precipitate. However, this procedure has the important disadvantage of producing a residual solution which contains dissolved values of copper and a metal of the group nickel and cobalt. The effluent solution from the reduction operation requires separate treatment for the recovery of dissolved metal values. The problem of the presence of nickel and/or cobalt in the solution can also be overcome by conducting the reducing reaction in a solution or slurry in which there are, at the initiation of the reaction, less than about 1.9 mols of free ammonia per mol of copper plus nickel and/or cobalt. However, this procedure has the important disadvantage of producing conditions which lead to the rapid corrosion of the vessel in which the reaction is conducted, even though the vessel may be formed of or provided with corrosion resistant material such as stainless steel. There is, therefore, a problem in obtaining a copper product substantially free from nickel and/or cobalt or a nickel and/or cobalt product substantially free from copper from a solution or slurry which contains nickel and/or cobalt in addition to the dissolved copper values.

We have found that the problem of producing copper metal powder of desirable physical characteristics and of high purity from an aqueous solution which contains dissolved salts of copper and at least one of the metals nickel and cobalt can be overcome by a surprisingly simple procedure.

Production of metals by gas reduction at elevated temperature and pressure from solutions in which such metals are present usually is conducted in a cycle which comprises an initial step in which extremely finely divided particles are formed followed by a series of densification steps in each of which fresh solution is treated and further metal deposits on previously precipitated individual particles which increase in size. In the initial step, the reaction vessel is charged with solution which contains, as dissolved salts, copper and at least one of the group nickel and cobalt. The reducing reaction is conducted under conditions which favour the formation and precipitation of the finely divided solid particles on which metal can deposit as reduction proceeds. Reduction is conducted until substantially all the dissolved copper is precipitated from the solution subjected to treatment. The solution is then discharged from the reaction vessel substantially free from dissolved copper values while the copper metal particles are retained in the reaction vessel.

Each following reducing reaction of the cycle comprises the treatment of a fresh batch of solution under conditions which favor the reduction of dissolved copper values and their precipitation from the solution. Precipitated copper values deposit and grow on the metal particles which are present in the reaction vessel from the preceding reducing reaction. At the end of each reduction step of the cycle, the treated batch of solution substantially free from dissolved copper values, is discharged from the reaction vessel leaving the precipitated copper metal particles in the reaction vessel. The number of reduction steps in the cycle, or the number of batches of solution treated, is determined by the size desired of the product metal particles or until the particles become of a number, size and weight such that it is difficult to hold them in suspension during the reducing reaction.

Dissolved nickel and/or cobalt values tend to precipitate from the solution as the copper content of the solution is depleted towards the end of each reduction step of the cycle. Heretofore, it had been considered that it was necessary to terminate the reduction prior to the precipitation of nickel and/or cobalt in order to produce copper substantially free from these impurities.

We have found, contrary to accepted procedures, that each reduction step of the cycle can be conducted until the solution is substantially free from copper, that is, each batch of solution can be reduced to about 0.1 gram of copper per litre or less. Nickel and/or cobalt tends to precipitate as reduction proceeds below about 10 grams of copper per litre. However, nickel and/or cobalt values precipitated towards the end of one reduction step can be dissolved and thus separated from the precipitated copper particles by heating the slurry with agitation in the treatment of a succeeding batch of solution for a period of time sufficient to dissolve the precipitated nickel and/or cobalt values before introducing the reducing gas into the reaction vessel. This sequence of heating, reduction and discharge of solution depleted in dissolved copper values while retaining precipitated copper particles in the reaction vessel is continued until the last or the next to the last reduction step. The copper metal powder in the reaction vessel at the beginning of the last reduction step contains nickel and/or cobalt precipitated at the end of the preceding reduction step. Fresh copper containing solution is charged into the reaction vessel and the resulting slurry is heated with agitation for a period of time sufficient to dissolve the precipitated nickel and/or cobalt values. Reducing gas is then charged into the reaction vessel to initiate and maintain the reducing reaction. However, in this step, the reducing reaction is continued for a time at least sufficient to reduce any copper oxide or hydroxide particles which may be present but safely below that at which there would be precipitation of nickel and/or cobalt values. Solution and copper metal particles are then discharged from the reaction vessel. Cooper metal particles are separated from the solution and are washed and dried. The solution can then be returned to a succeeding or following cycle of reduction steps for the precipitation of residual copper values.

Copper values contained as a dissolved salt in an ammoniated solution can be precipitated as copper metal powder by reacting the solution with a reducing gas such as hydrogen or carbon monoxide or mixtures thereof at a temperature above about 200° F. and under a partial pressure of reducing gas above about 20 pounds per square inch. A preferred temperature range is from about 250° F. to 400° F. and a partial pressure of reducing gas from about 200 to 400 pounds per square inch. Lower or higher temperatures and pressures can be employed. Under these conditions, the reducing reaction proceeds rapidly and conventional stainless steel reaction vessels and ancillary apparatus can be employed. We have found that dissolved copper values can be reduced and precipitated from an ammoniated solution having a pH value within the range of that produced by the presence in the solution of about 3.7 mols of ammonia per mol of dissolved copper plus nickel and/or cobalt to about pH 1.5. The presence of ammonia in excess of about 3.7 mols per mol of dissolved copper plus nickel and/or cobalt reduces the rate of the reaction to the extent that it is not an economically practical operation. The reducing reaction can be conducted at pH values below about 1.5 but the slurry would be highly corrosive and costly high pressure corrosion resistant apparatus would be required.

The improved method of the present invention is conducted under known temperature, partial pressure, of reducing gas and total pressure conditions from which a satisfactory rate of reduction is obtained.

The method is independent of the source of the copper which is present in the solution of slurry subjected to treatment. Copper is obtained on a commercial scale from the treatment of sulphide or oxidized ores and concentrates, from secondary or scrap metals, metal bearing residues and the like by leaching the metal bearing material with a suitable leach solution. Acid and basic aqueous carbonate and sulphate leach solutions are commonly used although other suitable solutions are known and can be employed. It is contemplated that the present method will be employed in the treatment of aqueous solutions in which the dissolved metals will be present as carbonates or as sulphates, which solutions are most usually encountered in the precipitation on a commercial scale of metals from solution by reaction with a reducing gas at elevated temperature and pressure. However, it will be understood that the present improvement is applicable to the treatment of other solutions which are amenable to treatment with a reducing gas for the precipitation of copper values. Also, the number of reduction steps in a cycle is determined by the desired size of the copper metal particles.

The following examples illustrates the operation of the process of the invention. The term "free ammonia" used in these examples is the amount determined by titration to the natural pH of the sulphate present in the solution. Copper, nickel and cobalt were present in the form of sulphates in the solutions subjected to treatment.

*Example 1*

In the procedure followed in this example, fresh batches of solution were reacted with a reducing gas in a cycle of reduction steps until copper particles were produced of desired size and density.

Each solution contained 63.7 g. p. l. copper, 3.2 g. p. l. nickel, 2.4 mols of free ammonia per mol of copper plus nickel. The reducing reactions were conducted at a temperature of about 375° F. at a partial pressure of hydrogen of about 300 pounds per square inch under a total pressure of about 500 pounds per square inch. Each reduction step of the cycle was conducted to produce a substantially copper free solution. The results obtained are illustrated in Table 1.

*Table 1*

| Densification number | Reduction time, minutes | Product metal | | Barren solution | |
|---|---|---|---|---|---|
| | | Copper, percent | Nickel, percent | Copper, g. p. l. | pH |
| 1 | 46 | | 3.12 | 1.0 | 7.2 |
| 2 | 54 | | 2.34 | .1 | 7.2 |
| 3 | 41 | | 2.04 | .1 | 7.2 |
| 4 | 34 | 97.1 | 2.09 | Nil | 7.4 |
| 5 | 28 | | 2.39 | .2 | 7.3 |
| 6 | 23 | | 2.53 | .1 | 7.4 |
| 7 | 9 | 97.0 | 2.17 | .3 | 7.3 |

The apparent density of the particles from the final densification step was 2.43 and the screen analysis was 0.5% from 250 to plus 325 mesh and 98.7% minus 325 mesh. The copper metal powder did not meet market specifications due to the high nickel content.

EXAMPLE 2

A cycle of reducing reactions was conducted on a series of batches of solution which contained 64 g. p. l. copper, 3.9 g. p. l. nickel, 2.3 mols of free ammonia per mol of copper plus nickel. The reducing reactions were conducted at about 375° F. at a partial pressure of hydrogen of about 300 pounds per square inch and a total pressure of about 500 pounds per square inch. Each reaction was terminated before precipitation of nickel commenced. The results obtained are illustrated in Table 2.

*Table 2*

| Densification number | Time, minutes | Copper, percent | Nickel, percent | Barren solution | |
|---|---|---|---|---|---|
| | | | | Copper, g. p. l. | pH |
| 1 | 60 | 99.1 | 0.01 | 10.8 | 6.6 |
| 2 | 80 | 99.1 | .006 | 17.1 | 6.6 |
| 3 | 61 | 99.1 | .01 | 18.6 | 6.6 |
| 4 | 67 | 99.1 | .005 | 18.3 | 6.6 |
| 5 | 65 | 98.9 | .005 | 17.0 | 6.5 |
| 6 | 65 | 97.8 | .005 | 20.2 | 6.5 |

The copper particles from the final densification step had an apparent density of 2.64 and the screen analysis was 6.1% from 100 to plus 150 mesh, 30.1% from 150 to plus 200 mesh, 4.2% from 200 to plus 250 mesh, 21.3% from 250 to plus 325 mesh, and 38.3 minus 325 mesh.

The copper metal powder satisfied market specifications insofar as the nickel content was concerned. The effluent solution from the reducing reactions was treated separately for the recovery of the dissolved copper and nickel values.

EXAMPLE 3

A solution which contained 63.3 g. p. l. copper, 3.8 g. p. l. nickel and 2.3 mols of free ammonia per mol of dissolved copper plus nickel was treated by the improved process of the present invention in a cycle of reduction steps. The reducing reactions were conducted at a temperature of about 375° F. at a partial pressure of hydrogen of about 300 pounds per square inch, and under a total pressure of about 500 pounds per square inch. The fresh solution charged into the reaction vessel in each reduction step after treatment of the first charge was agitated at a temperature of about 375° F. for about 5 minutes before initiating the reducing reaction by introducing the stream of hydrogen gas. The final reduction step of the cycle was terminated before precipitation of nickel occurred. Table 3 illustrates the results obtained by following this procedure.

Table 3

| Densification number | Time, minutes | Copper, percent | Nickel, percent | Barren solution Copper, g. p. l. | pH |
|---|---|---|---|---|---|
| 1 | 30 | | | 0.1 | 7.0 |
| 2 | 53 | 96.6 | 2.52 | .2 | 6.9 |
| 3 | 40 | 97.6 | 1.40 | .2 | 6.9 |
| 4 | 33 | 98.4 | .76 | .1 | 7.0 |
| 5 | 31 | 98.8 | .41 | .2 | 7.0 |
| 6 | 31 | 98.9 | .23 | .1 | 6.9 |
| 7 | 37 | 99.1 | .02 | 19.9 | 6.8 |

Solution discharged from densification step No. 7 was re-cycled as feed solution to the initial reduction step of a succeeding densification cycle.

The copper particles from the final densification step had an apparent density of 2.24 and the screen analysis was 0.1% from 100 to plus 150 mesh, 6% from 150 to plus 200 mesh, 1.9% from 200 to plus 250 mesh, 25.7% from 250 to plus 325 mesh and 66.3% minus 325 mesh.

There may be, at the time of adjusting the ammonia content of the solution prior to subjecting it to the reducing reaction, precipitation of basic copper salts which, with the solution, forms a slurry. During the course of the reducing reaction, these precipitated basic copper salts are reduced to copper metal powder.

EXAMPLE 4

It is found that in the treatment of an aqueous solution which contains dissolved salts of copper and cobalt, that cobalt also precipitates from the solution as it becomes depleted in dissolved copper values towards the end of each reduction step. A slurry comprised of basic copper salts and solution contained 61.4 g. p. l. copper, 8.9 g. p. l. cobalt, and 2.0 mols of free ammonia per mol of dissolved copper and cobalt. Charges of this slurry were reacted in a cycle of reduction steps in a reaction vessel at a temperature of about 400° F., at a partial pressure of hydrogen of about 300 pounds per square inch. The reduction cycle consisted of two densifications. The first densification was continued until part of the cobalt was precipitated from the solution in metallic form with the reduced copper powder. The second batch of slurry was agitated with the mixed copper-cobalt powder for a period of 60 minutes at 400° F. to dissolve the cobalt before initiating the second reducing reaction. The second reducing reaction was terminated before the precipitation of cobalt occurred. The contents of the reaction vessel were discharged at the end of the second reduction step. Copper metal powder was separated from the solution and was washed and dried. The solution from the second reduction step was re-cycled to a succeeding cycle of reduction steps for the recovery of dissolved copper values. Table 4 illustrates the results obtained by following this procedure.

Table 4

| Densification number | Time, minutes | Copper, percent | Cobalt, percent | Barren solution Copper, g. p. l. | Cobalt, g. p. l. | pH |
|---|---|---|---|---|---|---|
| D1 | 120 | 93.9 | 4.05 | Trace | 6.0 | 7.8 |
| D2 | 50 | 98.4 | 0.076 | 23.8 | 10.7 | 6.5 |

The above Tables 3 and 4 illustrate that the reducing reaction can be conducted, with the exception of the final reduction step of the cycle, until it is substantially completely depleted in dissolved copper values without effecting adversely the purity of the final product copper metal powder. The successful operation of the improvement is not dependent on the conditions under which the reducing reactions are conducted or the temperature of the slurry during heating and agitation prior to the initiation of the reducing reactions. The rate of dissolution of nickel and/or cobalt values proceeds rapidly as the heating step is conducted at temperatures above about 212° F. However, as the reducing reaction usually is conducted at temperatures within the range of from about 250° F. to about 500° F., the preliminary heating or digestion can be conducted simultaneously with heating the slurry to the desired reduction temperature and the heating can be conducted, if necessary, for several minutes after that temperature is attained to ensure at least substantially complete dissolution of precipitated nickel and/or cobalt values.

The improved method of the present invention possesses several important advantages. Primarily, copper product metal powder can be produced substantially free from nickel and/or cobalt impurities from an aqueous solution or slurry which contains dissolved nickel and/or cobalt values in addition to the copper values. Also, the reducing reaction by means of which copper metal powder is precipitated from the solution can be continued until the solution is substantially depleted in dissolved copper values thus producing an effluent solution which is in ideal condition for the recovery of dissolved nickel and/or cobalt values substantially free from contamination by copper. The solution from the final reduction step of the cycle which contains a relatively high copper content can be treated outside the process, of course, for the recovery of the dissolved copper, nickel and/or cobalt values. However, it is preferred to re-cycle it to a reduction step in a succeeding cycle to recover the dissolved copper values and produce an effluent solution which can be treated for the recovery of dissolved nickel and/or cobalt values substantially free from contamination by copper.

What we claim as new and desire to protect by Letters Patent of the United States is:

1. In a method of producing copper metal powder from aqueous solutions and slurries which contain dissolved salts of copper and at least one of the metals of the group consisting of nickel and cobalt by reacting such solutions and slurries in a reaction vessel with a sulphur-free reducing gas at elevated temperature and pressure whereby dissolved copper values are reduced to and precipitated from the solution as copper metal powder; the improvement which comprises conducting the reducing reaction in a cycle of reducing steps in which, following initial precipitation of copper metal particles and prior to the final step of the cycle, a charge of fresh solution is reacted with said reducing gas in a step of the cycle in the presence of previously precipitated copper metal particles until the solution is substantially depleted of dissolved copper values; each step of the cycle comprising agitating and heating the charge of fresh solution at a temperature within the range of from about 200° F. to about that at which the reducing reaction is conducted prior to the introduction of the reducing gas until dissolution of dissolved metals of the group consisting of nickel and cobalt is obtained; reacting said solution with a sulphur-free reducing gas until the solution is substantially depleted in dissolved copper values; discharging reacted solution from the reaction vessel; and, in the final step of the cycle, terminating the reducing reaction prior to precipitation from the solution of a metal of the group consisting of nickel and cobalt; and thereafter separating and recovering product copper metal powder of high purity from the final step of the cycle.

2. The method according to claim 1 in which at least part of the reacted solution from the final step of a cycle of reducing reactions is passed to a reduction step of a succeeding cycle for the precipitation of dissolved copper values contained therein.

3. The method according to claim 1 in which the fresh solution subjected to the reducing reaction contains at least about 1.9 mols of free ammonia per mol of copper plus nickel and cobalt.

4. In a method of producing copper metal powder from aqueous solutions and slurries which contain the dissolved salts of copper and at least one of the metals of the group consisting of nickel and cobalt by reacting such solutions and slurries in a reaction vessel with a sulphur-free reducing gas at elevated temperature and pressure whereby dissolved copper values are reduced to and precipitated from the solution as copper metal powder; the improvement which comprises subjecting a charge of fresh solution to the reducing reaction in a reaction vessel until it is substantially depleted in dissolved copper values; discharging reacted solution from the reaction vessel while retaining therein precipitated copper metal particles; introducing at least one additional charge of fresh solution into the reaction vessel to form a slurry with previously precipitated copper metal particles; agitating and heating the slurry to a temperature within the range of from about 200° F. to about that at which the reducing reaction is conducted prior to the introduction of the reducing gas for a period of time sufficient to dissolve values of metals of the group consisting of nickel and cobalt precipitated with the copper metal particles in the preceding reducing reaction; subjecting the resulting solution to reaction with a sulphur-free reducing gas at elevated temperature and pressure; subjecting each charge of fresh solution prior to the final charge to the reducing reaction until it is substantially depleted in dissolved copper values; terminating the reduction of the final charge of the series prior to precipitation of a metal of the group consisting of nickel and cobalt; and recovering precipitated copper metal particles of high purity from the final step of the cycle.

5. The method according to claim 4 in which the fresh solution subjected to the reducing reaction contains at least about 1.9 mols of free ammonia per mol of copper plus nickel and cobalt.

6. The method according to claim 4 in which the fresh solution subjected to the reducing reaction contains from about 1.9 to about 3.7 mols of free ammonia per mol of copper plus nickel and cobalt.

No references cited.